Patented Sept. 29, 1931

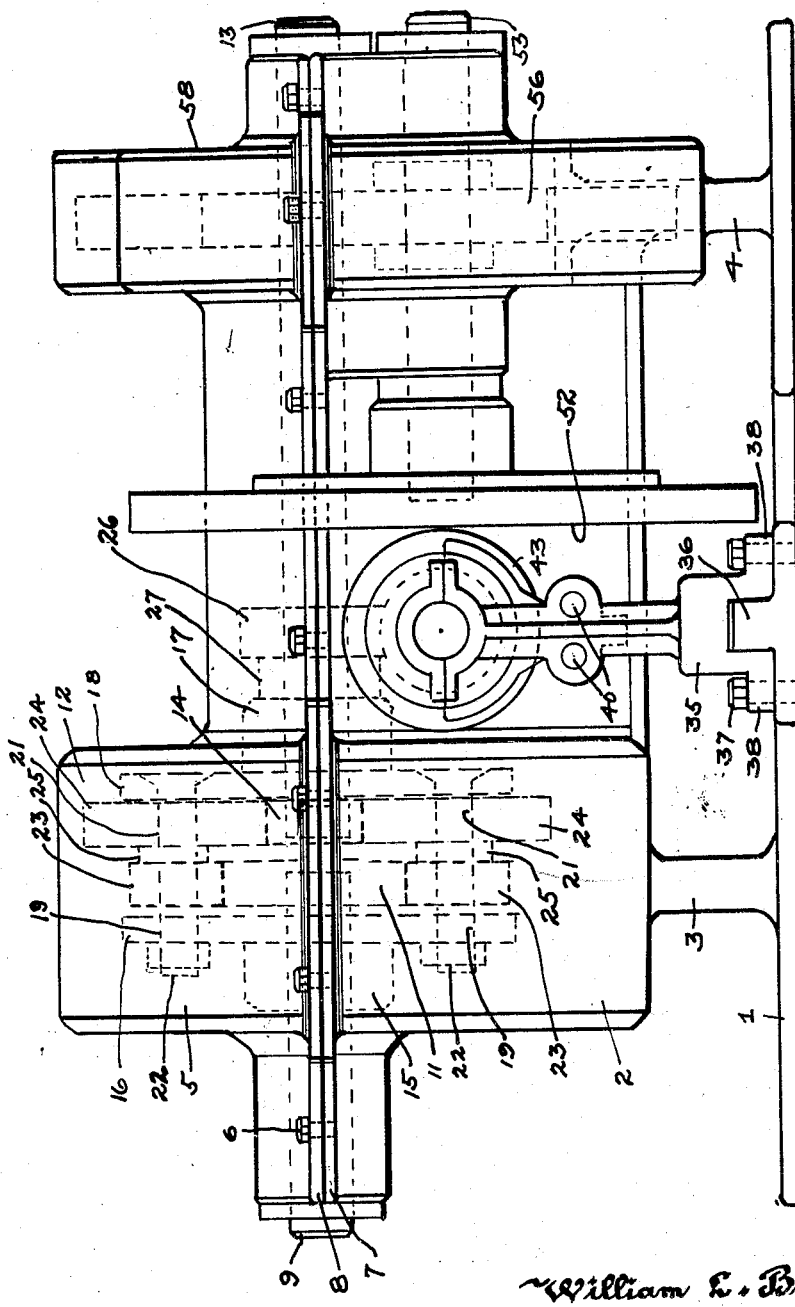

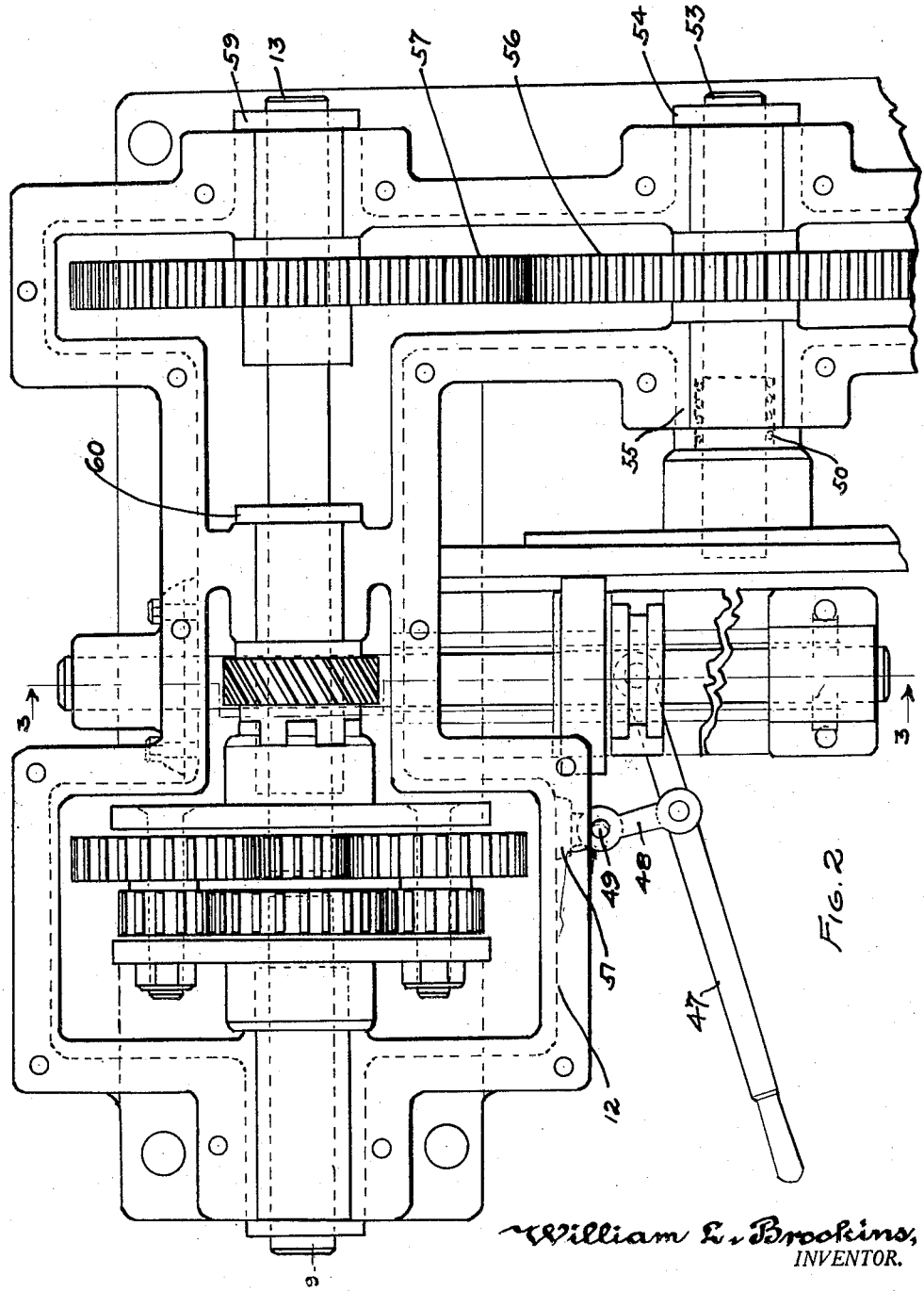

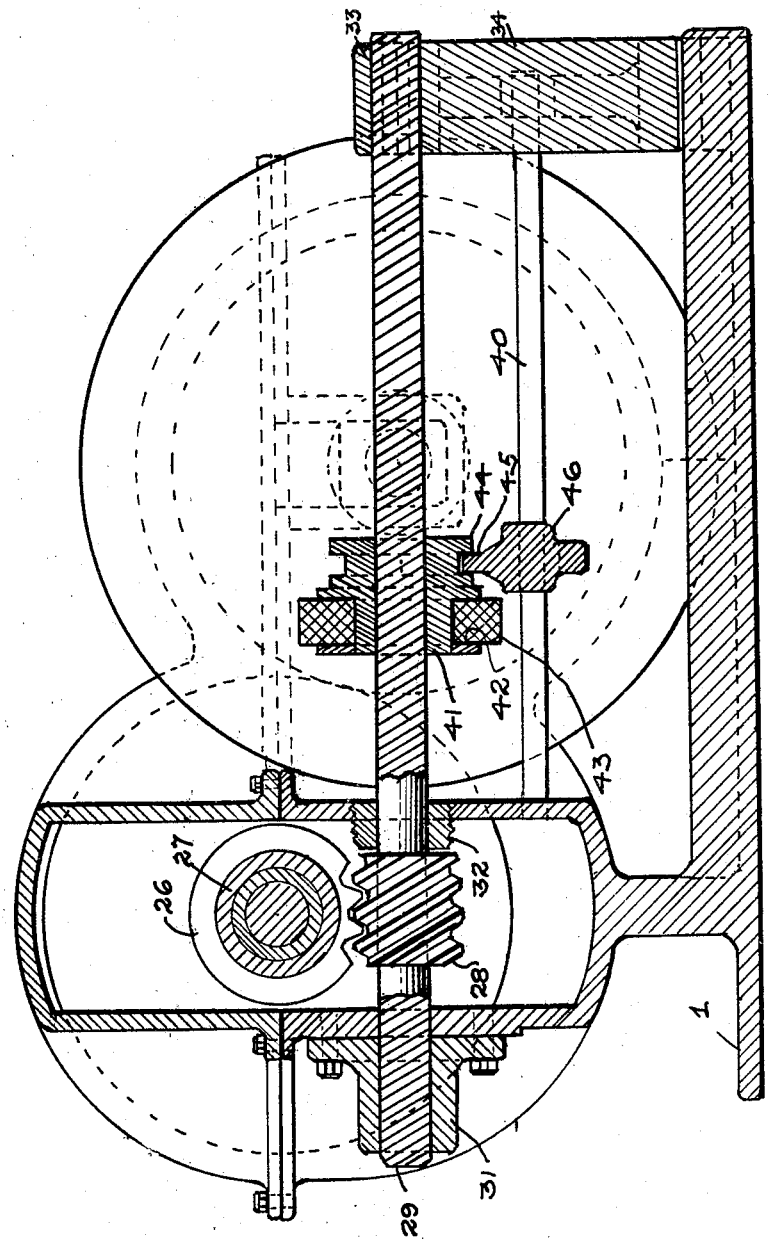

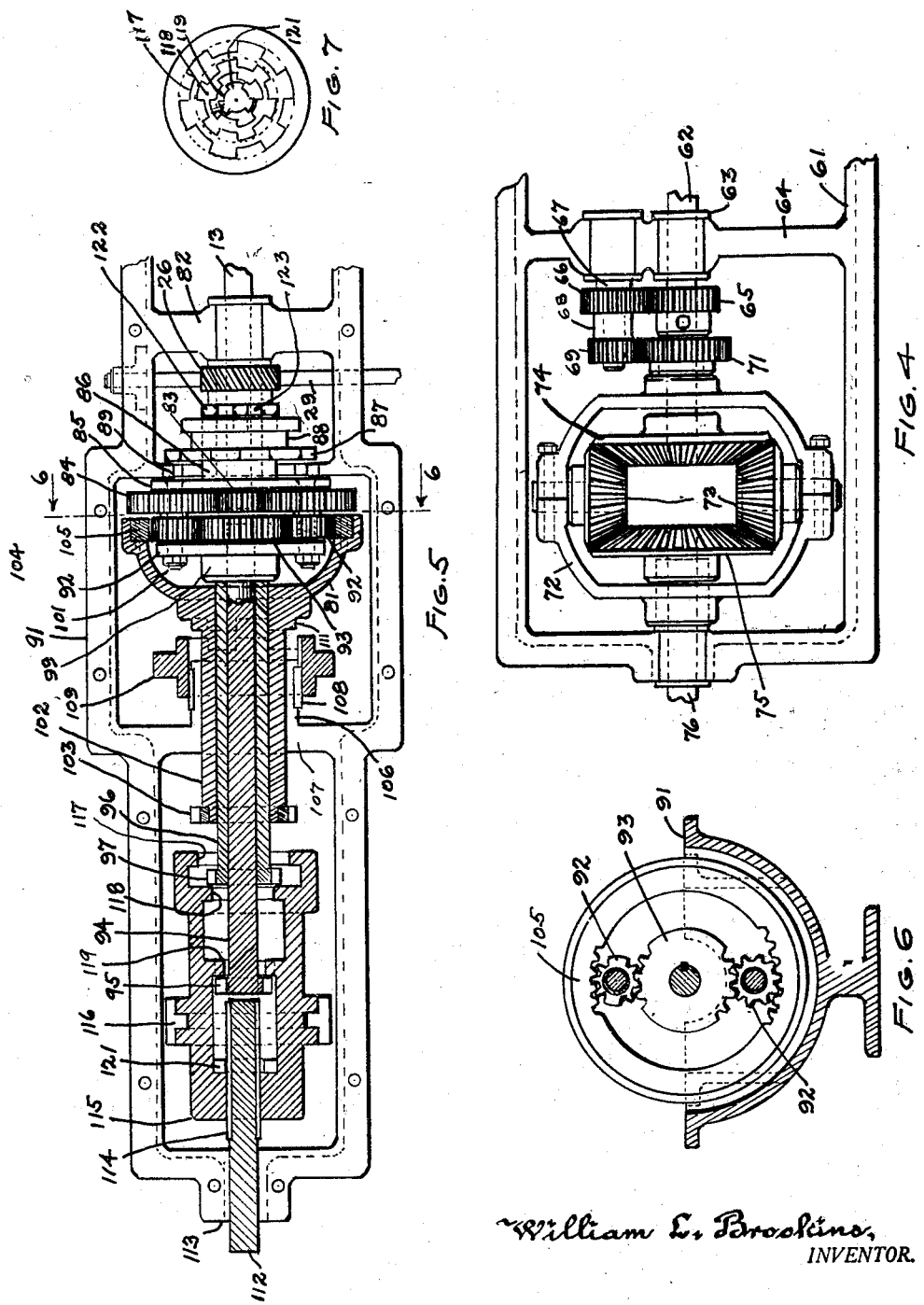

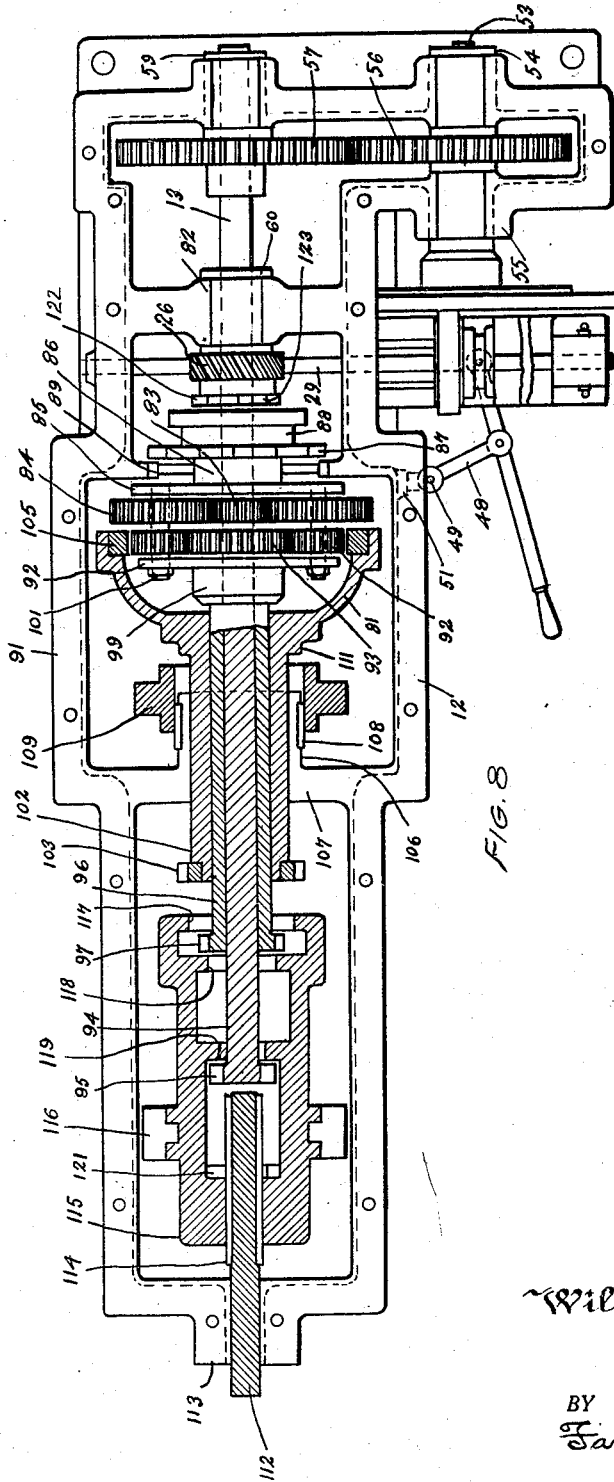

1,824,868

UNITED STATES PATENT OFFICE

WILLIAM L. BROOKINS, OF CLEVELAND, OHIO

TRANSMISSION MECHANISM

Application filed March 30, 1929. Serial No. 351,344.

This invention as indicated relates to a transmission mechanism. More particularly this invention relates to a transmission mechanism having a control mechanism whereby variations of speed and direction of drive may be brought about through regulating the speed and direction of motion of the gears with which the main power transmitting gears coact. Various embodiments may be made of the inventive idea. Thus, a planetary drive may be used wherein the normally stationary member may be so connected with a control that a different speed reaction may be brought about by controlling the speed of such control device, and, furthermore, the power transmitted through such control may be carried back to the driven shaft and thus utilized to supplement the normal speed of the regular drive of the transmission.

In like manner the control may be used to reduce the amount of speed below that which would ordinarily be transmitted, by changing the speed or the relative direction of motion of the control.

Also an irreversible drive may be used which permits the use of an infinitely variable friction disk speed changing means for the control device. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a side elevation of a transmission mechanism embodying the principles of my invention; Fig. 2 is a top plan view of the apparatus shown in Fig. 1 with the cover portion of the casing removed; Fig. 3 is a transverse sectional view taken along the lines 3—3 shown in Fig. 2, looking in the direction of the arrows; Fig. 4 is a top plan view of another form of transmission mechanism embodying the principles of my invention; Fig. 5 is a top plan view showing still another form of transmission mechanism embodying the principles of my invention; Fig. 6 is a transverse sectional view taken along the lines 6—6 shown in Fig. 5, looking in the direction of the arrows; Fig. 7 is a diagrammatic view of the selective sleeve showing the positions of the various sizes of clutch members therein; Fig. 8 is a top plan view showing the transmission mechanism disclosed in Fig. 5 coupled with a friction disk control mechanism of the type shown in Fig. 2.

As is clearly shown in Fig. 1 the apparatus comprises a base 1 upon which is supported a transmission casing 2 by means of standards 3, 4, the casing being adapted to be closed by a cover section 5 suitably secured thereto by means of fastening bolts 6 positioned at intervals around projecting flanges 7, 8, upon the base and cover plate respectively. The driven shaft 9 carries a gear 11 at its inner end centrally within the gear housing 12. The drive shaft 13 is positioned in alignment with the driven shaft 9 and carries upon its inner end a gear 14. A planetary transmission spider is rotatably supported upon the driven shaft and drive shaft immediately adjacent the gears 11 and 14 respectively, said spider comprising a hub portion 15 carrying a plate 16 sleeved upon the drive shaft and a hub portion 17 and a plate 18 sleeved upon the driven shaft. The plates 16 and 18 are provided with aligned apertures 19 and 21 respectively through which studs 22 are engaged, said studs carrying pairs of pinions 23, 24, respectively. The pinions 23 may comprise two oppositely disposed pairs of pinions, as shown, or three or more pairs of pinions as may be found desirable.

The pinions 23 lie in the plane with the gear 11 and in constant mesh therewith and the pinions 24 lie in the plane of the gear 14 and are in constant mesh therewith. The pinions 23 and 24 are integrally connected by short sleeve sections 25 which causes the same to rotate in unison.

Immediately adjacent the hub 17 of the spider a worm wheel 26 is positioned, said worm wheel being integrally connected with the hub 17 by means of the sleeve 27. The worm wheel 26 is adapted to be driven by a worm 28 mounted on a transverse shaft 29, which is suitably journalled in bearings 31, 32, mounted on the side walls of the housing and at its free end is supported in a bearing 33 carried on a standard 34 secured to the base plate 1 by means of a slotted foot member 35 engaging over an upstanding lug 36 on the base plate and being secured to the base plate by means of bolts 37 extending through suitable apertures in the flanges 38. Slidably engaged upon the shaft 29 and suitably keyed thereto is a friction drive wheel 41 provided with a peripheral groove 42 within which is seated a band of suitable friction material 43 such as fiber, rubber composition, or the like.

The friction wheel has a yoke 44 formed integrally therewith adapted to be engaged by a fin 45 on a shifting member 46. The shifting member 46 is slidably engaged on parallel guide bars 40 and is provided with a suitable lever extension 47 supported on a link 48 pivotally secured to a pivot pin 49 mounted on a bracket 51 secured to the side of the housing 12. The band 43 on the friction wheel is positioned in frictional contact with a friction disc 52 of large size affording an adequate number of positional adjustments for suitably varying the speed of the friction wheel. The friction disc is carried on a counter-shaft 53 mounted in suitable bearings 54, 55 in the rearward portion of the casing and carries a large gear 56 firmly secured thereto. Said gear is in constant engagement with a gear 57 mounted on the drive shaft 13. By means of a coil spring 50 within a recess at the rear of the disc hub, the friction disc is kept in resilient contact with the friction wheel.

The transmission casing has a suitable enlargement 58 to cover the gears last described. The drive shaft is provided with suitable bearings 59, 60 in the casing walls.

With an apparatus constructed as just described, the operation of the device will be as follows. When power is transmitted to the drive shaft 13, the gear 14 will be actuated and will transmit the power at a suitable ratio through the pinions 23, 24 to gear 11 on the driven shaft 9. The amount of power so delivered to the gear 14 is dependant upon the amount of motion transmitted to the spider by means of the worm 28 in engagement with the worm wheel 26 on the sleeve 27 of the yoke 17. The direction and amount of motion transmitted to the spider and its associated pinions is dependant upon the position of the friction wheel 41 on the shaft 29. The provision of an irreversible worm drive for the spider in this embodiment of my invention permits its use on automobiles without danger of reversely driving the mechanism through the driven shaft when coasting on hills.

The friction wheel receives its power from the friction disc 52 which is driven through the gear 57 on the drive shaft 13 and which drives the friction disc through the gear 56. The friction wheel may be driven in either direction depending upon which side of the center of the friction disc 6 it is in contact with and the amount of speed transmitted from the friction wheel will depend upon its distance from the center of a friction disc.

As it is near the center of the disc it will receive less speed than when positioned near the periphery of such disc. Through the shifting of the friction wheel therefore any desired amount of speed may be transmitted to the spider and its series of pinions and the speed of the spider and its pinions relative to its associated gears will directly affect the amount of speed transmitted through said pinions to the gear 11 on the driven shaft. Thus, by changing the position of the friction wheel on the friction disc a wide variety of speeds may be imparted to the spider, and by changing such speed relatively to the gears, the direction of motion as well as the speed of the driven shaft may be controlled.

Instead of using a variable control to make a change in the ratio between the drive and driven shafts, a mechanism may be provided which has a fixed ratio of operation as is illustrated in Fig. 4. This type of control drive is not irreversible. In said construction the supporting frame 61 supports the drive shaft 62 in a suitable journal 63 in a cross frame member 64, said drive shaft carrying a gear 65 on its inner end in constant mesh with a gear 66 on a stub shaft 67. The gear 66 is integrally connected by means of a sleeve 68 and a gear 69 which is in constant mesh with a gear 71 sleeved upon the inner end of the drive shaft and being integrally connected with a yoke 72 carrying beveled pinions 73. The beveled pinions 73 engage on one side with a bevel drive wheel 74 secured to the inner end of the drive shaft and on the other side with a bevel pinion 75 secured to the inner end of the driven shaft 76.

With an apparatus constructed in the manner shown in Fig. 4, the action takes place as follows. When driving the spider and its associated gears in its normal neutral direction, that is, in the same direction as the drive member, at a speed less than its normal ratio, the driven member 76 will rotate at a decreased speed in the opposite direction from the drive member 62.

When driving the spider in its normal neutral direction at a speed greater than its normal ratio, the driven member 76 will rotate at a decreased speed in the same direction as that of the drive shaft 62.

In conjunction with the friction disc mechanism illustrated in Figs. 1, 2, and 3, a transmission mechanism may be employed such as is shown separately in Fig. 5 and in full combination in Fig. 8, which is capable of being adjusted to an almost infinite number of combinations of speed through the provision of an internal gear drive system 81 superimposed upon the planetary gear system shown in Figs. 1 to 3. Thus the drive shaft 13 will have a worm wheel 26 sleeved upon it adjacent the cross frame member 82 which worm wheel will be operated by means of the cross shaft 29. The drive shaft carries on its inner end a gear 83 in constant mesh with pinions 84 on the spider 85, the hub 86 of which spider is rotatably engaged on the drive shaft and has splined thereon a shiftable notched locking plate 87 adapted to be moved by means of a yoke engaged with the shifting collar 88.

When moved into a forward position the plate will engage a notched ring 89 formed on the frame 91 housing the transmission. The pinions 84 carry pinions 92 on their inner ends which are in alignment with a gear 93 on the inner end of an intermediate shaft 94. The intermediate driven shaft carries a clutch member 95 at its free end. Sleeved upon the intermediate shaft is a tubular member 96 carrying a clutch member 97 at its free end and being integrally secured to the disc 92 of the spider by means of an enlarged hub portion 99. The discs 85 and 92 are connected by pins 101 which support the integrally connected pinions 84 and 90. Sleeved upon the tubular member connected with the spider is a sleeve 102 which carries at its free end a clutch member 103 and at its opposite end a substantially semi-circular shell 81 forming a support for the internal gear 105.

The sleeve 102 is rotatably supported in a bearing 106 projecting inwardly from a cross-wall 107 of the housing. Said bearing carries keys 108 with which a shiftable locking collar 109 is slidingly engaged, said locking collar is adapted to slide forwardly and interlock with lugs 111 on the shell of the internal gear member. The driven shaft 112 is journaled in an extension 113 at the rearward portion of the housing and is provided at its end within the housing with a plurality of splines 114, which are engaged by a sliding selective sleeve or clutch member 115. A shifting yoke 116 serves to move the clutch member into various positions of adjustment.

The sliding selective clutch member has four clutch elements internally of the same, the member 117 at its free end serving to engage the clutch member 103 to rotate the driven shaft in reverse or toward the left at a ratio, in the gear sizes shown, one-eighth to 1. Intermediately upon said clutch member is provided a second clutch member 118 adapted to engage with the clutch member 97 on the spider to turn the driven shaft to the right at the ratio, in the gear sizes shown, of one-fifth ($\frac{1}{5}$) to one. Next in position toward the driven shaft is an internal clutch member 119 which is adapted to engage the clutch member 95 on the intermediate shaft when the selective clutch member is moved toward the driven shaft and serves to drive the driven shaft to the right at a ratio, in the gear sizes shown, of one-fourth ($\frac{1}{4}$) to one. When the selective clutch member is shifted toward the spider to its extreme limit of motion, the clutch member 119 will engage with the clutch member 97 and the clutch member 121 on the inner end of the selective clutch member will then simultaneously engage the clutch member 95. When thus engaged, the drive will be direct from the drive shaft to the driven shaft.

Thus five positive speeds are provided for by mechanism which may be coupled as indicated, and in the gear sizes shown, will operate as follows: By holding the spider with the clutch member 87 in engagement with the notches 89, the driven shaft 112 turns to the right one-fourth ($\frac{1}{4}$) revolution to one revolution of the drive shaft 13, and the internal gear 105 turns to the left one-eighth ($\frac{1}{8}$) of a revolution to one revolution of the drive shaft.

By holding the internal gear 105 by means of a locking collar 109, the spider turns to the right one-fifth ($\frac{1}{5}$) of a revolution to one revolution of the drive shaft 13, and a driven shaft 112 turns to the right one-third ($\frac{1}{3}$) of a revolution to one revolution of the drive shaft.

By shifting the selective clutch member 115 toward the right as shown in Figs. 5 and 8, to its extreme limit of motion, all the parts will turn to the right and there will be no rotation of any of the gears upon each other, and the drive will be direct.

By means of the friction disc drive illustrated in Figs. 1, 2, 3 and 8, the spider may be driven in either direction and at substantially any desired speed within the limits of the friction drive ratios provided.

When the spider is driven more than five-sixteenths ($\frac{5}{16}$) revolutions to one revolution of the drive shaft in an opposite direction, a reversal of the direction of the driven shaft is caused.

When the spider is driven the same number of revolutions in the same direction as the drive shaft, no pinions rotate and the driven shaft has the same direction and speed as the drive shaft. When the spider is driven in the same direction as the drive shaft, the driven shaft is increased in normal speed in the same direction as the drive shaft.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a transmission mechanism a casing, a bearing sleeve fixedly supported within said casing, a drive shaft mounted within said bearing sleeve, a gear at the free end of said drive shaft, a driven shaft, a gear at the free end of said driven shaft, a spider comprising a pair of plates provided with hubs, one of said hubs being supported on the fixed bearing sleeve of the driving shaft, said plates carrying pinions meshing respectively with said gears on said drive shaft and driven shaft, said pinions being connected to each other in pairs, a friction disc, means for driving said disc from said drive shaft, a friction wheel on a cross-shaft carrying a worm, and a worm wheel secured to the spider hub adapted to rotate the same and modify the driving action through the pinions in speed and direction in accordance with the speed and direction of said spider.

2. In a transmission mechanism a casing, a bearing sleeve fixedly supported within said casing, a drive shaft mounted within said bearing sleeve, a gear at the free end of said drive shaft, a driven shaft, a gear at the free end of said driven shaft, a spider comprising a pair of plates provided with pinions intermediate the same, said plates carrying hubs, one of said hubs having a worm wheel secured thereto, and one of said hubs being rotatably mounted on said fixed bearing sleeve of said drive shaft, said pinions of said spider meshing respectively with said gears on said drive shaft and driven shaft, said pinions being connected to each other in pairs, a countershaft, a friction disc mounted on said countershaft, means for driving said countershaft from said drive shaft, and a friction wheel on a cross-shaft carrying a worm, said worm meshing with said worm wheel on the spider and adapted to rotate the same and modify the driving action through the pinions in speed and direction in accordance with the speed and direction of said spider, and means for shifting said friction wheel upon said friction disc.

3. In a transmission mechanism, a casing, a drive shaft, a gear at the free end of said drive shaft, a driven shaft, a gear at the free end of said driven shaft, a spider carrying pinions meshing respectively with said gears on said drive shaft and driven shaft, said pinions being connected to each other in pairs, means for locking said spider to the casing to prevent rotation thereof, a countershaft, a friction disc, mounted on said countershaft, a spring about said countershaft to resiliently hold said disc in a forward position, means for driving said countershaft from said drive shaft, a friction wheel on a cross-shaft carrying a worm, and a worm wheel on the spider adapted to rotate the same and modify the driving action through the pinions in speed and direction in accordance with the speed and direction of said spider, and means for shifting said friction wheel upon said friction disc.

4. In a transmission mechanism, a casing, a drive shaft carrying a pinion at its free end, a driven shaft carrying a pinion at its free end, a spider sleeved upon said drive and driven shafts, a driven sleeve rotatably supported upon said driven shaft and connected with said spider at one end and having a clutch member at its opposite end, and a second driven sleeve rotatably mounted upon said first sleeve and carrying an internal gear upon one end and a clutch member on its opposite end, a shiftable member for locking said second sleeve to said casing and a selective clutch member adapted to be shifted to engage the clutch members on said driven members.

5. In a transmission mechanism, a casing, a drive shaft carrying a pinion at its free end, a driven shaft carrying a pinion at its free end, a spider sleeved upon said drive and driven shaft, a driven sleeve rotatably supported upon said driven shaft and connected with said spider at one end and having a clutch member at its opposite end, and a second driven sleeve rotatably mounted upon said first sleeve and carrying an internal gear upon one end and a clutch member on its opposite end, a shiftable member for locking said second sleeve to said casing and a selective clutch member adapted to be shifted to engage the clutch members on said driven member, and means for driving said spider from said drive shaft.

6. In a transmission mechanism, a casing, a drive shaft carrying a pinion at its free end, a driven shaft carrying a pinion at its free end, a spider sleeved upon said drive and driven shafts, a driven sleeve rotatably supported upon said driven shaft and connected with said spider at one end and having a clutch member at its opposite end, and a second driven sleeve rotatably mounted upon said first sleeve and carrying an internal gear upon one end and a clutch member on its opposite end, a shiftable member for locking said second sleeve to said casing and a selective clutch member adapted to be shifted to engage the clutch members on said driven member, and irreversible means for driving said spider from said drive shaft.

7. In a transmission mechanism, a casing, a drive shaft carrying a pinion at its free end, a driven shaft carrying a pinion at its free end, a spider sleeved upon said drive and driven shafts, a driven sleeve rotatably supported upon said driven shaft and connected with said spider at one end and having a clutch member at its opposite end, and a second driven sleeve rotatably mounted upon said first sleeve and carrying an internal gear upon one end and a clutch member on its opposite end, and a selective clutch member adapted to be shifted to engage the clutch members on said driven member, means for driving said spider from said drive shaft, and unitary means for releasing said spider from its drive and locking said spider against rotation through engagement with said casing.

Signed by me this 27th day of February, 1929.

WILLIAM L. BROOKINS.